United States Patent
Kuper

(10) Patent No.: US 9,327,997 B1
(45) Date of Patent: May 3, 2016

(54) WATER TREATMENT PROCESS AND APPARATUS

(71) Applicant: Richard J. Kuper, Charleston, AR (US)

(72) Inventor: Richard J. Kuper, Charleston, AR (US)

(*) Notice: Subject to any disclaimer, the term of this patent is extended or adjusted under 35 U.S.C. 154(b) by 134 days.

(21) Appl. No.: 13/861,756

(22) Filed: Apr. 12, 2013

Related U.S. Application Data

(60) Provisional application No. 61/686,831, filed on Apr. 12, 2012.

(51) Int. Cl.
  C02F 1/04      (2006.01)
  B01D 1/22      (2006.01)
  C02F 1/08      (2006.01)

(52) U.S. Cl.
  CPC . *C02F 1/048* (2013.01); *B01D 1/22* (2013.01); *B01D 1/222* (2013.01); *C02F 1/08* (2013.01)

(58) Field of Classification Search
  None
  See application file for complete search history.

(56) References Cited

U.S. PATENT DOCUMENTS

| | | | | |
|---|---|---|---|---|
| 2,440,778 | A * | 5/1948 | Maglaughlin | 159/26.1 |
| 3,946,495 | A | 3/1976 | Osdor | 34/15 |
| 3,997,406 | A * | 12/1976 | Arvanitakis | 202/175 |
| 4,188,195 | A | 2/1980 | Jablin | 55/89 |
| 4,192,746 | A | 3/1980 | Arvanitakis | 210/73 |
| 5,289,640 | A * | 3/1994 | McCabe | 34/487 |
| 6,892,471 | B2 * | 5/2005 | Ragnarsson | 34/92 |
| 7,882,646 | B2 | 2/2011 | Gorbell et al. | 34/514 |
| 8,147,772 | B2 * | 4/2012 | Wilford | 422/309 |

* cited by examiner

Primary Examiner — Renee E Robinson
Assistant Examiner — Jonathan Miller
(74) Attorney, Agent, or Firm — Keisling & Pieper PLC; Trent C. Keisling

(57) ABSTRACT

A water treatment system for treating viscous sludge containing entrained solids in water by evaporating the water from the viscous sludge to produce water and dehydrated solids including a tank with an internal agitator with an associated rotary meter to dispense metered quantities of the sludge into a subsequent dehydrator for heating the sludge to evaporate the water therefrom to produce dehydrated solids exiting through a meter and a gas containing evaporated water going to a condenser connected to the dehydrator to receive gas therefrom for condensing it into a liquid that is discharged from the system and provide dehydrated gas to a subsequent vacuum pump that maintains a relatively static vacuum.

8 Claims, 9 Drawing Sheets

WATER TREATMENT PROCESS AND APPARATUS

CROSS-REFERENCE TO RELATED APPLICATIONS

This application claims priority to and is a continuation-in-part of patent application Ser. No. 61/686,831, filed Apr. 12, 2012, entitled WATER TREATMENT PROCESS AND APPARATUS.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The invention pertains to improvements in water treatment processes and apparatus and particularly the arrangement of the apparatus and processing equipment associated therewith. Known art can be found in class 202 subclass 175 and in class 210, subclass 73 and in other classes and subclasses.

2. Description of the Known Art

Those skilled in the art will appreciate that it is often desirable to remove entrained solids from waste water and the like. Often, processing of wastewater is slowed by the removal of these entrained solids. The known art has provided a variety of proposals to meet this need and such proposals have been attempted, and they may have been acceptable for their intended purposes. One conventional proposal is to first treat the wastewater to remove most of the entrained solids, perhaps as much as 98% of the entrained solids. After the first step, the remaining water entrained solids are substantially more viscous, and it is commonly referred to as sludge. The sludge is often next placed in a lagoon so that the remaining solids settle to the bottom over an extended period of time. Water from the tops of these lagoons is normally drawn off as the solids settle until the lagoon fills. These lagoons are often outside and exposed to the weather and climate and can release malodorous fumes. The lagoons are often rained upon and can spill uncontrollably if flooded, which is undesirable.

In the fairly recent past, such lagoon systems have become less favored and it is now necessary to address the removal of these concentrated solids from the sludge instead of simply pumping the sludge into a lagoon and waiting until the solids settle out. Proposed solutions provided in the art have been limited in their application and have failed to address large quantities of entrained solids in large volumes of wastewater that must be processed in a relatively short period of time, such as is often encountered with animal processing facilities. Such facilities often generate wastewater containing large amounts of animal portions and especially fat. These entrained solids are difficult to substantially remove from the wastewater and especially sludge in a timely manner.

Most previously proposed solutions for such problems have not provided processes and devices adept at handling large quantities of solids entrained in large volumes of water and those that have attempted this are unduly slow and inefficient or otherwise unsatisfactory. Therefore, a need exists for an improved water treatment process and apparatus and one that can successfully address the perceived shortcomings of the known art is desirable.

Known art which may be relevant to the present invention includes the following patents with their abstracts, the teachings of which are incorporated by reference.

U.S. Pat. No. 3,997,406, issued to Arvanitakis on Dec. 14, 1976, entitled Evaporating Apparatus, is for a method of and apparatus for receiving low-volume liquid sludge concentrations, exposing the liquid-sludge slurry to a heating surface thereby evaporating a portion of the liquid from the slurry, and advancing the contaminant bearing liquid for further exposure to additional heating surfaces such that as the slurry passes therethrough, in thermal contact with the heating surfaces, the solids content is increased by evaporating the liquid material while allowing the solids material to accumulate on the heating surfaces which are automatically and continuously cleaned to maintain the efficiency of the system and discharge these materials in a substantially dry state. This reference is for low volumes of wastewater treatment.

U.S. Pat. No. 4,192,746, issued to Arvanitakis on Mar. 11, 1980 is entitled Liquid Clarification System. Its abstracts describes a liquid clarification system for separating solid and/or chemical contaminants from an unclarified liquid wherein a variable influent is passed through a settling clarifier to separate a portion of the contaminants from the liquid forming a semi-solid sludge. The sludge is passed into a reservoir and delivered to a filtration system at a controlled predetermined percentage of solids material. The solids material is circulated through the filtration system to form a filter cake on the septum of filters carried in a filtration chamber and the liquid is clarified by passing through the filter cake formed thereon. Periodically when the filter cake must be reformed, the expended cake is removed from the septum and conveyed from the filtration chamber through a sludge drying system to be discharged as dry solids waste material. This reference uses a filter to remove entrained solids, which requires filter removal and cleaning.

U.S. Pat. No. 4,188,195, issued to Jablin on Feb. 12, 1980 is entitled Treatment of Waste Liquor. Its abstract describes a waste liquor treatment system comprising an evaporator in combination with a gas cooler, the evaporator providing fractional distillation of waste liquor, thereby separating the liquor into its several components of gaseous vapors, purified water and concentrated brine. Condensed liquor from the gas cooler or flushing liquor used to spray an industrial process gas in the collecting mains of the gas-producing plant provides thermal energy from its waste heat to run the evaporator. The evaporator consists of a boiler section, a condenser section, a vacuum pump, a liquor circulating pump, and nozzles for extracting the products. The gas cooler may be one or two stage. In the one stage cooler, the hot liquor which condenses in the gas cooling process or flushing liquor from the collecting mains of the gas-producing plant provides energy for the evaporator through means of a heat exchanger. In the two stage gas cooler, the hot liquor in the first stage is circulated directly to the boiler section of the evaporator. The hot liquor from the second stage is circulated through a separate heat exchanger. This reference does not handle entrained solids.

U.S. Pat. No. 3,946,495, issued to Osdor on Mar. 30, 1976 is entitled Method and Apparatus for Drying Moisture-Containing Solids Particularly Domestic Refuse and Sludge Cakes. This patent describes a method and apparatus for the production of solid fuel and steam by drying moisture-containing solids, such as refuse and sludge cakes, in a multi-stage heating zone by using the moisture-containing solids as the feed-water in a direct contact countercurrent flow pressurized boiler. After vaporizing the bulk of the moisture in the heating zone of the boiler, the solid residue is further dried in a multi-stage flashing zone. From the upper end of the heating zone is removed a nearly saturated steam including the water vapor evaporated from the moisture-contained solids by the heat of cooling of the introduced superheated steam. A portion of the removed steam equal to the vaporized moisture is heated and then directed to a turbine, generating all the power required to operate the system. The bulk of the removed steam equal to the introduced superheated steam is compressed, reheated and recycled through the heating zone. The dried solid is removed at the lower end of the flashing zone and is incinerated, and the recovered heat is utilized to supply the heat required for said drying, and to produce saturated steam for heating purposes, or superheated steam for power generation. In the latter case the heat of condensation of the turbine exhaust steam is utilized advantageously as a heat source in a distillation plant for fresh water production. This reference is directed to the burning of the solids, which are in some instances valuable commodities that can be advantageously used for other purposes if collected instead of incinerated.

U.S. Pat. No. 7,882,646, issued to Gorbell et al. on Feb. 8, 2011 is entitled Process and System for Drying and Heat Treating Materials. This patent describes systems and methods for conversion of high moisture waste materials to dry or low moisture products for recycle or reuse. The equipment systems comprise a gas turbine generator unit (preferred heat source), a dryer vessel and a processing unit, wherein the connection between the gas turbine and the dryer vessel directs substantially all the gas turbine exhaust into the dryer vessel and substantially precludes the introduction of air into the dryer vessel and wherein the processing unit forms the dried material from the dryer vessel into granules, pellets or other desired form for the final product. Optionally, the systems and methods further provide for processing ventilation air from manufacturing facilities to reduce emissions therefrom. This reference and the preceding references fail to contain potential offensive odors.

Other attempts involving filters to spin the sludge to separate water from the solids are difficult to clean and maintain or to use with high volumes of sludge. Other attempts at dehydrating the sludge have required too much energy to heat the sludge to evaporate the water or too much time to evaporate the water for use with high volumes of sludge.

Also, commercially available equipment and components may be relevant, including commercial and municipal sewage treatment systems and processes and accompanying equipment and the like. Such equipment may be used in implementing an exemplary embodiment in accordance with the present invention.

None of these references, either singly or in combination, disclose or suggest the present invention. It is desirable to have an improved water treatment process and apparatus to address the perceived shortcomings of the known art. It is desirable to produce a usable dried and separated solid product removed from the wastewater. It is desirable to substantially contain offensive odors within the treatment apparatus.

It is desirable to process large quantities of wastewater to remove entrained solids therefrom in a timely manner, generally in the range of five to ten gallons of wastewater per minute.

While it is evident from past attempts that solids removal from waste water is desirable, the known art is limited in its teaching and utilization, and an improved system is needed to overcome these limitations. An improved water treatment process and accompanying apparatus should provide a simple and efficient system for meeting the various needs of field personnel. The system should enable the user to work efficiently in the field or at other remote locales as desired. The system should be adaptable to retrofit to existing locales such as animal husbandry facilities, animal processing facilities, waste processing facilities, municipal sewage facilities and the like.

SUMMARY OF THE INVENTION

The present invention addresses the perceived needs in the known art discussed above. In this regard, the present invention substantially fulfills this need. The present invention provides an improved water treatment process and apparatus that produces a usable dried and separated solid product removed from the wastewater. The present invention also substantially contains offensive odors within the treatment apparatus and it processes relatively large quantities of wastewater or sludge to remove entrained solids therefrom in a timely manner.

In one exemplary embodiment in accordance with the present invention the process involves using a heated apparatus with an internal vacuum to remove entrained solids from wastewater. This process is a tail process that may be advantageously employed with a conventional upstream waste removal facility that separates most of the solids from the wastewater. Such a conventional treatment facility results in a wastewater substantially free from entrained solids and a thicker, more viscous wastewater, often referred to as sludge, which has a much higher concentration of solids to wastewater and generally oils and greases as well. The present invention is most particularly directed toward the treatment of such sludge to remove the entrained solids from the remaining wastewater and retrieve the oils and greases.

The process uses an initial preheater and an adjacent condenser to heat the entering sludge using exiting vapors from a subsequent conversion chamber or heat exchanger in one exemplary embodiment. In another exemplary embodiment, the preheater and condenser are combined into a single unit. The sludge is next passed to an entry tank with an internal agitator (which may also be optionally heated) where oils and greases are decanted and removed from the tank as output streams while the sludge may be further heated slightly. The entry tank dispenses the decanted sludge from the bottom section and below the liquid level into a holding area (either another tank or a section of piping) and then a rotary valve that then dispenses the sludge into the primary heat exchanger. The conversion chamber or primary heat exchanger evaporates the water under a vacuum to produce a dehydrated solid and vapors. This vacuum makes the process require less thermal energy as the product being dehydrated does not have to be heated to as high a temperature and serves to move the vapors out of the heat exchanger and into the subsequent unit for vapor condensation (i.e. either the preheater and condenser or the combined preheater/condenser). Furthermore, by keeping a substantially static vacuum in the primary heat exchanger, odors are contained within the heat exchanger and do not freely escape since vapors are not released to atmosphere in this process. The vapors that are produced during the evaporation process move through a baffle at the exit end of each heat exchanger and the vapors are routed to a preheater and condenser where the vapors are condensed back into water, first in the above mentioned preheater and then in the subsequent condenser (if separate), before passing them to an off-site treatment facility for further processing such as the previously mentioned municipal treatment facility. The vapors produced from water in the process are thus condensed back to water in the process but without the removed solids.

When used with an animal processing facility producing solids containing fat and oil and grease entrained in the wastewater, the process takes substantially all of the oil and grease out of the sludge being dehydrated. This is important because dehydrated sludge can be used as a fuel source or be considered as a valuable byproduct as well as the decanted oils and grease. The process may be particularly advantageously employed to dehydrate the sludge produced from facilities producing sludge high in oil and/or grease and/or animal fats or the like.

The entry tank with an agitator (which may optionally be internally heated) receives the feed stream or sludge to begin processing primarily by decanting or separating the oil and grease and removing them from the sludge. The feed stream may be preheated or heating may begin in the tank (when using a heated tank). The entry tank then passes the decanted sludge into a holding area, which may be another tank or a section of piping and then into a rotary meter located proximate the bottom of the tank. The holding area accumulates sludge while the rotary meter passes a desirable quantity of sludge into the primary heat exchanger.

The drying apparatus preferred in the present process includes a conversion chamber or primary heat exchanger or dehydrator which uses at least one and usually several jacketed screw augers as heat exchangers. Each jacketed screw auger has an internal rotary auger or screw in an outer jacket that receives the incoming sludge to remove the water therefrom by way of evaporation to produce a substantially dehydrated solid product. Several heat exchangers in series may be necessary to dehydrate the sludge desirably to produce a final product. Such multiple jacketed screw heat exchangers are of substantially the same construction and physical character Each screw heat exchanger includes a rotary auger or screw inside a heated jacket. The jackets use permits the passage of a heated medium such as heated liquid oil or water or steam or the like therein, which heats the jacket around the screw auger, including the interior walls of the jacket adjacent the flow path of the sludge. The screw is preferably hollow or otherwise includes internal piping permitting the passage of a heated medium such as heated liquid oil or water or steam or the like therein, which heats the exterior walls of the screw adjacent the flow path of the sludge. Thus, the sludge is heated on both sides as it flows inside the jacket and against the screw. At least near the end of the screw a relatively thin film of sludge exists against the screw to promote efficient vapor formation but most preferably the entire length of the screw has a thin film of sludge. The screws are inclined upwardly and the screws and jackets are in close proximity to each other with a relatively slender fluid flow pathway therebetween. As the fluid is driven by the rotation of the screw, the fluid and entrained solids are essentially squeezed between the screw and the inside of the jacket since the outer diameter of the screw with flights is almost the same dimension as the inner diameter of the jacket.

The first and each subsequent screw heat exchanger receives the sludge as its input and outputs a more viscous sludge until substantially all water is removed from the sludge at the exit from the last screw heat exchanger. The heat exchangers are ideally gravity fed at their entrances but inclined upwardly from horizontal distally and move the sludge via the rotary action of the screw flights from the entry to the exit while evaporating water therefrom. At the screw exit, the dehydrated product passes either to a subsequent screw dehydrator or exits through a final exit rotary meter. A motor drives a synchronized drive chain that rotates the augers to move the sludge along the system. In one exemplary embodiment, all of the heat exchangers use thermal fluids exclusively but in one optional configuration, in the first heat exchanger, the output vapors from subsequent heat exchangers may be optionally routed in the jacket to heat it while partially condensing the vapors as well instead of using a thermal fluid.

The entry and exit rotary meters work like revolving doors and restrict material entry into the system, and they may be adjusted to control volume throughput of the system. A vacuum is preferably maintained by the constant removal of any small amounts of gasses entering the system (e.g. air leaks, entrained air in the sludge, decompositional gasses from the sludge, etc.). While the vacuum does not have to be complete, it should be lower than atmospheric pressure to prevent the escape of odorous gasses from the system. Extensive testing has determined that a relatively substantial vacuum lowers the vapor pressure and boiling points of water desirably and so maintenance of a relatively high vacuum is preferred.

The preheater (and subsequent condenser if separate) receive the evaporated water from the dehydrators and capture the waste heat for warming the entering sludge while condensing the evaporated water into a liquid for discharge from the system and through which any remaining vacuum gasses may be captured for transmission to an offsite treatment facility. A vacuum isolation valve prevents vapors from directly exiting the preheater and entering the condensation tank and ensures that the vapors enter the condenser for condensation therein. A vacuum pump at the end of the line and adjacent the condensation tank maintains the system vacuum.

In addition to providing the features and advantages referred to above, it is an object of the present invention to provide improved water treatment process and apparatus that thoroughly removes entrained contaminants and solids from wastewater.

It is another object of the present invention to provide a produce a usable dried and separated solid product removed from the wastewater.

It is still another object of the present invention to substantially contain offensive odors within the treatment apparatus.

It is a further object of the present invention to process large quantities of wastewater to remove entrained solids therefrom in a timely manner.

It is an object of the present invention to provide a station that may be easily retrofitted and adapted to existing locales such as animal husbandry sites, animal processing facilities, municipal wastewater treatment sites and the like.

It is a further object of the present invention to provide a system that may be easily maintained.

It is a still further object of the present invention to provide a system that is quickly and easily deployable by a user.

These and other objects and advantages of the present invention, along with features of novelty appurtenant thereto, will appear or become apparent by reviewing the following detailed description of the invention in conjunction with the appended drawings.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

The present invention addresses the perceived needs in the known art discussed above. The present invention provides an improved water treatment process and apparatus that produces a usable dried and separated solid product removed from the wastewater. The present invention also substantially contains offensive odors within the treatment apparatus and it processes large quantities of wastewater to remove entrained solids therefrom in a timely manner, generally in the range of five to ten gallons of wastewater per minute.

In general, the present invention may be advantageously used with many water treatment processes and especially with the sludge that is comes off the DAF (dissolved air flotation) units in poultry slaughter facilities (or other food processing facilities) as well as the sludge that is coming off the DAF units in the further processing (cook) plants for the processing of poultry or other food stuffs. It can also be applied to many other dehydrating processes. There is an existing need for the present invention so that the sludge can be rid of any solids/pathogens that might be contained therein and the water can then be discharged into the city sewers and not have to be hauled off in vacuum trucks and plowed down in fields, which can be an expensive operation in addition to the product being plowed down is often a product with pathogens. Also the dried product resulting from the process now has value as a high protein with pathogens essentially sterilized or as a fertilizer. It could also be more efficiently deposited in a landfill as it has the moisture removed and any pathogens substantially eliminated.

Figure 1:
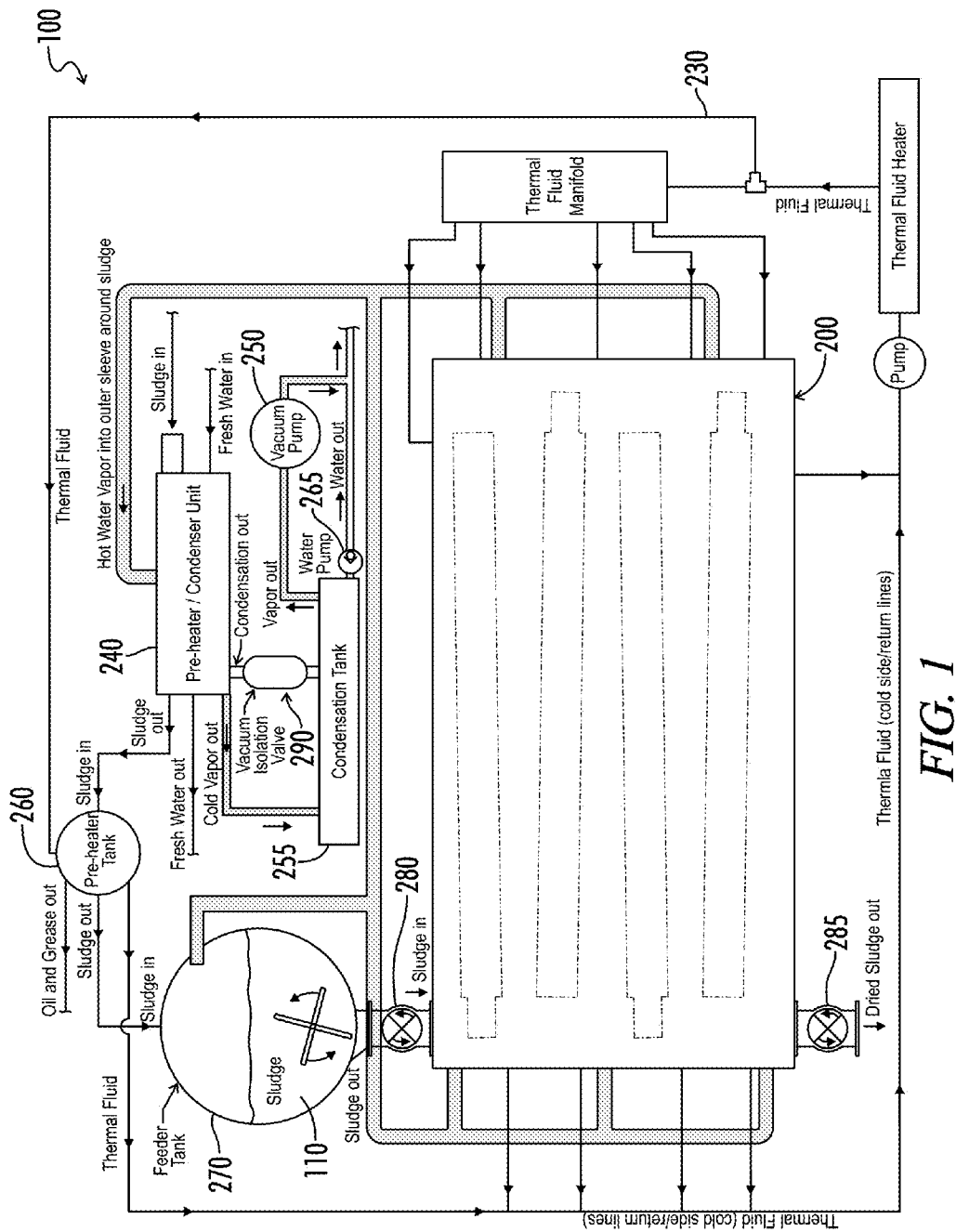
FIG. 1 is a schematic diagram of an exemplary embodiment of the wastewater treatment process and apparatus deployed in a stationary implementation in accordance with the present invention.

The process 100 utilizes a closed loop, sealed system of interconnected heat exchangers 200 with heated internal screw augers 220 to convert the water in the incoming sludge into water vapor that may be separated from the now dehydrated sludge solids (FIG. 1). This water vapor is separated from the solids and then condensed back to water without the solids in it. The solids are discharged at the end of the bottom heat exchanger/heated screw as a dried product without the water and with any pathogens eliminated from the heat treatment. The process typically uses at least (4) heat exchanger/heated screws 210 per module 200. Any number of modules can be added to accommodate different size plants or needs.

The heat exchangers 210 and their internal screws 220 are internally heated with thermal fluid 230 to evaporate water from the sludge. The vapors that are produced during the evaporation process move through a baffle 212 on each heat exchanger and the vapors are routed to a preheater 240 and condenser 245 where the vapors are condensed back into water. By passing the vapors through the preheater the incoming sludge is partially heated by the vapors and the vapors are cooled to start the condensation process. This happens because the enthalpy of evaporation and the enthalpy of condensation are equal and opposite. By scalping as much heat produced in the process as possible, the process uses less energy to perform its job. Each of the heat exchangers/screws are placed one on top of the other so as to discharge one to the next.

Since the process is a closed loop system; and product (sludge) or other product to be dehydrated is introduced under seal and is taken out of the system under seal; a vacuum, (typically in the range of 15 to 26 inches mercury column) is maintained on the product inside the heat exchangers. The heat exchangers 210 as well as the screws 220 inside them are heated with thermal fluid. (Again; the top heat exchanger may alternatively be heated by the vapors produced in the process). The thermal fluid is typically heated to a temperature between 250 degrees Fahrenheit and 400 degrees Fahrenheit; but can be heated to a higher or lower temperature depending on the product being dehydrated. The temperature can be changed and regulated to achieve the maximum dehydrating level. The thermal fluid is pumped through the system at a rate (volume per minute) that will not let the temperature differ significantly between inlet and outlet (typically 10 degrees Fahrenheit) or less.

The entire process is managed with a Programmable Logic Computer that monitors thermal fluid temperature, vacuum, vapor temperature, material throughputs, rotation speeds of the screws and the inlet and outlet rotary meters as well as other functions of the process.

Vacuum (produced by vacuum pump 250) is applied to the inside of the heat exchangers 210 that have the conveyors 220 inside them. The vacuum serves several purposes. One is to lower the boiling point of the water in the sludge. This helps to keep the thermal energy use down in the process. The second use of the vacuum is to exhaust the vapors produced from the water in the sludge that was introduced to the heat exchanger/heated screw combination. Another purpose of the vacuum is to keep the odor inside the system. No odor can escape to atmosphere in a vacuum. The system uses check valves that are so installed as to let vapors escape to atmosphere if there is a vacuum pump failure or in the case where the vacuum pump cannot remove the amount of vapor being produced in the system. The check valves will not; however, allow atmosphere to enter the system.

The sludge or product to be dehydrated by this process in one embodiment first passes through a preheater 240 that uses the heat energy in the exhausted vapor/condensate from the process to impart some heat or energy to the sludge. The sludge then moves to a combination O and G separator 260 (Oil and Grease separator or decanter) which can be mounted above or in proximity to an air lock (which also serves as a feeder for the process). This separator 260 may also be heated with thermal fluid. It can optionally have at least a slight vacuum applied to it to prevent the escape of any odors. When heated, this separator/feeder system also becomes part of the dehydration process with the vacuum used to pull off any vapors that were formed by the heating of the product in the presence of a vacuum. The sludge leaves the bottom of the O and G separator to an associated accumulation area, which is usually a feeder tank 270 (but which could be simply piping) that is maintained at the same level of vacuum as the rest of the process before entering the rotary meter 280 such that there is no pressure differential through the airlock. A valve between the O and G separator and the accumulation area controls the fluid flow therebetween, using the pressure differential between the separator and the accumulation area to facilitate fluid flow. This makes for an excellent feeder system.

The feeder tank 270 includes a float sensor 272 to determine the height of the sludge inside the tank 270. A float 273 that rides on the top of the sludge moves a metal (preferably carbon steel) target up and down inside a plastic pvc (schedule 40) pipe extending from the top of the tank 270 based on sludge height. The target proximity to an upper or lower shield capacitive proximity sensor 274 is used to determine the sludge height and to control the valve between the tank 260 and the feeder tank 270. The feeder tank also includes an internal rotary agitator 276 (approximately 10" diameter blades) for mixing the sludge proximate the meter 280.

The meter 280 receives sludge from tank 270 and then passes the sludge to the dehydrator 200. As mentioned previously, the dehydrator 200 includes jacketed screw heat exchangers 210. The jacketed heat exchangers are built with a specially designed oil galley 218 in the outer jacket to cause the thermal fluid to spiral around the heat exchanger instead of traveling straight through it. This causes more heat transfer within the heat exchanger. The thermal fluid is then passed to the next heat exchanger.

The heated conveyor screws 220 are designed with a specially designed input and output shaft that is cross drilled at the ends to allow for heating the inside of the entire screw. The input and output shafts are through drilled to allow thermal fluid to enter and exit the screw through rotary unions.

By using both the jackets of the heat exchangers as well as the inside of the heated screws, the product is exposed to two heat sources at the same time in the presence of a vacuum. The product moves through a small area between the two heat sources. This not only vaporizes the product quickly in the presence of a vacuum; but it also keeps the vapor from re-condensing inside the heat exchanger from the cooling effect of the enthalpy of evaporation (2260 kj/km) (or 970.6 Btu/lb.). The heat exchangers are also built on an incline (typically 2 inches rise per 10 feet). This causes the product to be wiped in a thin film over each of the screws instead of it only being screwed along on the bottom of the heat exchanger. This causes the product to be introduced to heat in a thin film. The product is easier to vaporize as a thin film; again making for efficiency in the process. The heated conveyor screws are designed to fill most of the cavity in the heat exchangers.

In one exemplary embodiment, the heat exchanger outer pipe can be a 10" outside diameter mechanical tube with a wall thickness of 0.109" and an internal diameter of 9.782" with an inner pipe having a 6⅝" outside diameter schedule 10 pipe with an inner diameter of 6.357" and an internal screw auger with an outer diameter of 5⅞" (including bore and flight height of approximately 2") and with an inside diameter of 3.06" for the hollow bore of schedule 40 pipe.

The screws are designed so they will displace approximately 75% of the cross section of the inside of the heat exchanger and leave less than 0.25" between the flight and the outer pipe inside wall. The screws are constructed with a sufficiently aggressive pitch so as to move the product through the heat exchangers.

The vacuum for the process is preferably produced using a liquid ring pump with a variable displacement of up to 340 cfm although other types of vacuum pumps could be used. After the system has been purged of air when operation commences and a static vacuum achieved, during operation most if not all of the vapors that are produced come from the water in the system and most if not all of these vapors are condensed back to water in the preheater and condenser before the vacuum pump; there is very little if anything to be exhausted into the water exit pipe by the vacuum pump and therefore no odor emitted to the atmosphere. The condensed water may be returned to the city sewer or another selected repository without the solids.

By scalping as much heat as possible using the vapors to heat the first heat exchanger (in one embodiment not shown), then passing the vapors/condensate to the pre heater (and condenser if separate), the process becomes very energy efficient.

This process also produces a pathogen free-dried product as well as providing pathogen free water being returned to the sewer.

In one exemplary embodiment in accordance with the present invention the process involves using a heated apparatus with an internal vacuum to remove entrained solids from wastewater (FIGS. 2-9). This process is a tail process that may be advantageously employed with a conventional upstream waste removal facility that separates most of the solids from the wastewater. Such a conventional treatment facility results in a wastewater substantially free from entrained solids and a thicker, more viscous wastewater, often referred to as sludge, which has a much higher concentration of solids to wastewater and generally oils and greases as well. The present invention is most particularly directed toward the treatment of such sludge to remove the entrained solids from the remaining wastewater and retrieve the oils and greases.

The process uses an initial preheater to heat the entering sludge using exiting vapors from the subsequent primary heat exchanger. The preheated sludge is next passed to a heated entry tank with an internal agitator where oils and greases are decanted and removed from the tank as output streams while the preheated sludge is further heated slightly. The entry tank is preferably under at least a slight vacuum and most preferably the same vacuum as the rest of the system. The entry tank dispenses heated sludge from the bottom section and below the liquid level into a rotary valve that then dispenses the sludge into the primary heat exchanger. The primary heat exchanger evaporates the water under a vacuum to produce a dehydrated solid and vapors. This vacuum makes the process more energy efficient as the product being dehydrated does not have to be heated to as high a temperature and serves move the vapors out of the heat exchanger and into a subsequent condenser. Furthermore, by keeping vacuum in the system, odors are contained within it and do not freely escape since vapors are not released to atmosphere in this process. The vapors that are produced during the evaporation process are condensed, first in the above mentioned preheater and then in the subsequent condenser, before passing them to an off-site treatment facility for further processing such as the previously mentioned municipal treatment facility. The vapors produced from water in the process are thus condensed back to water in the process but without the removed solids.

When used with an animal processing facility producing solids containing fat and oil and grease entrained in the wastewater, the process takes substantially all of the oil and grease out of the sludge being dehydrated. This is important because dehydrated sludge can be used as a fuel source or be considered as a valuable byproduct as well as the oil and grease. The process may be particularly advantageously employed to dehydrate the sludge produced from facilities producing sludge high in oil and/or grease and/or animal fats or the like.

Figure 2:
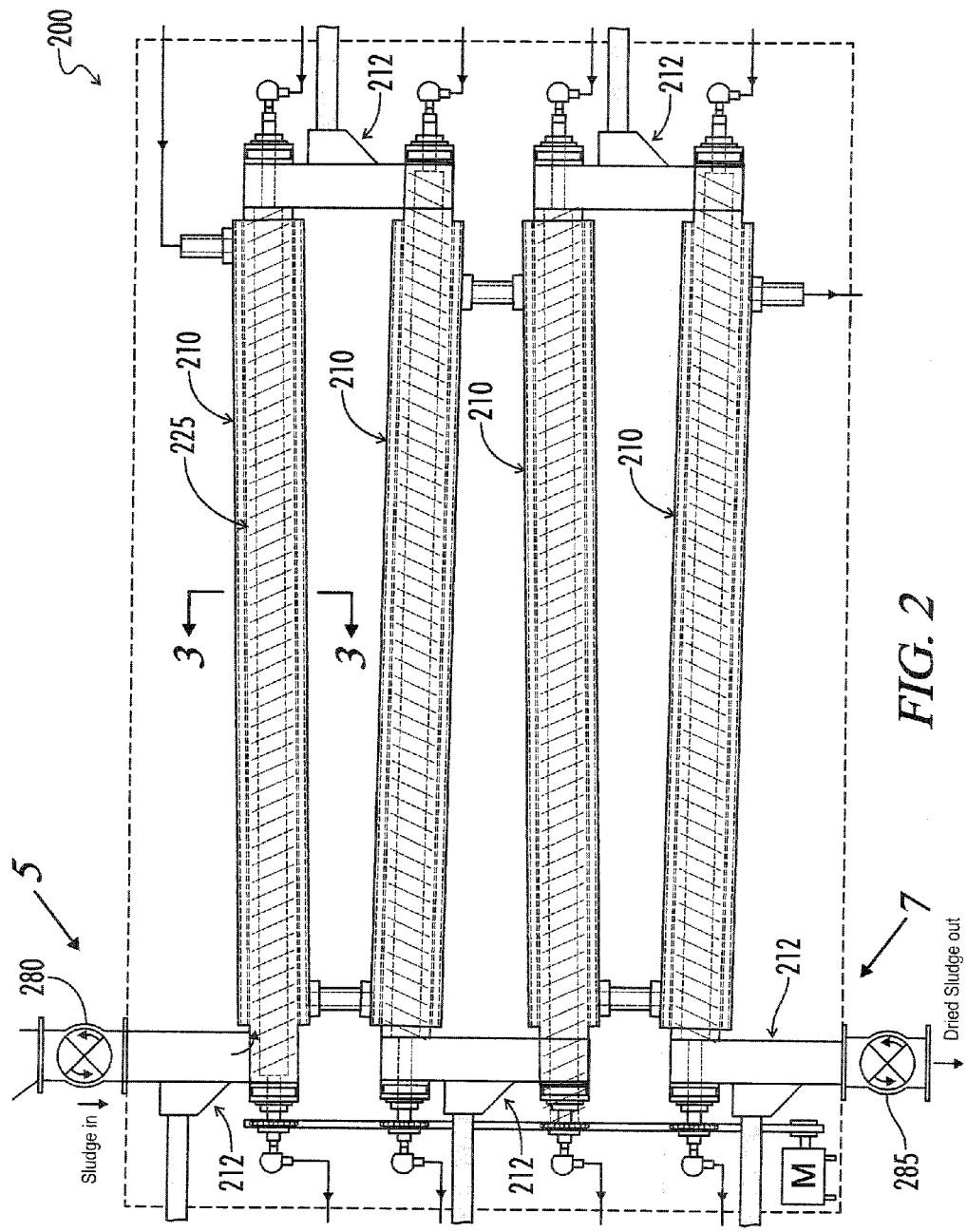
FIG. 2 is an enlarged schematic diagram of the dehydrator unit of FIG. 1.
Figure 3:
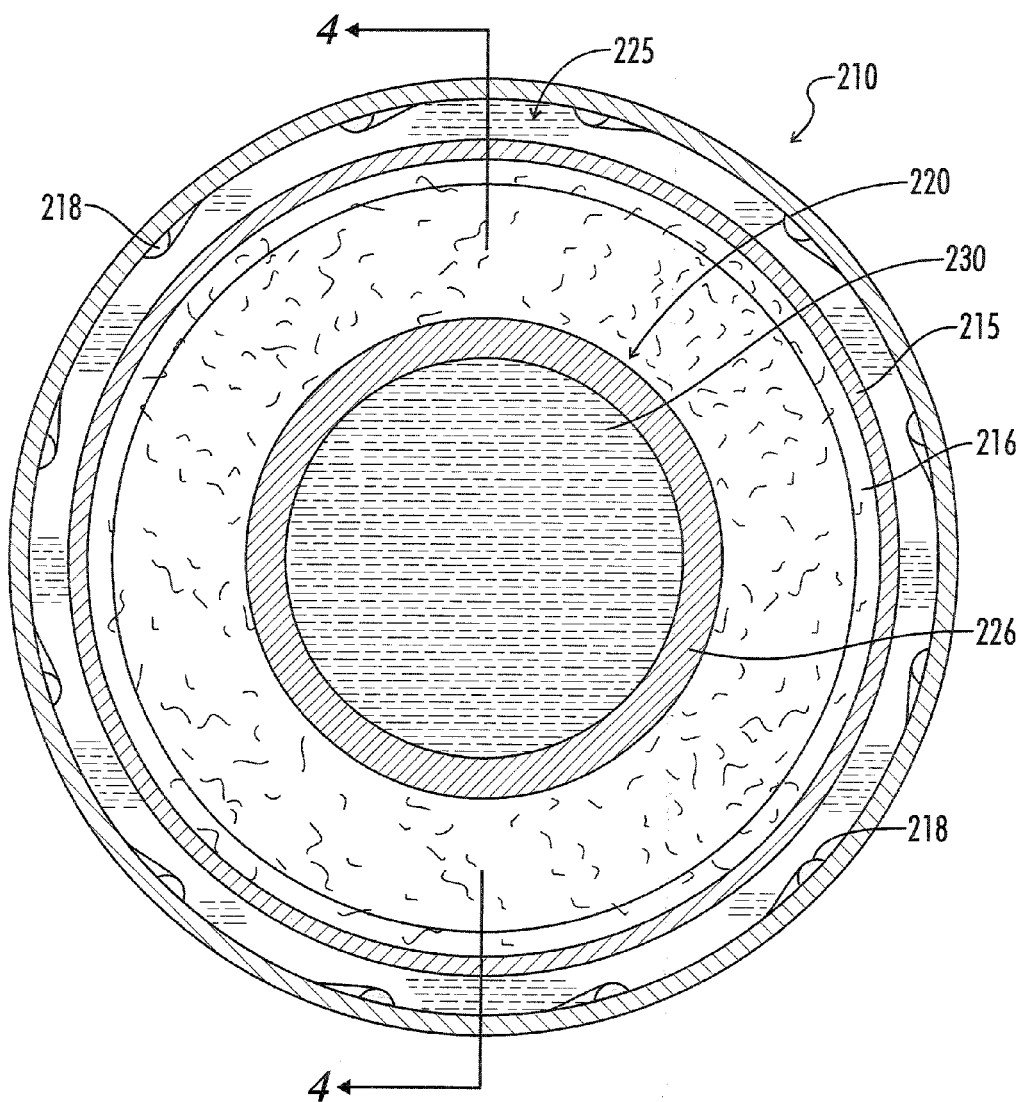
FIG. 3 is a cross-sectional view taken along line 3-3 in FIG. 2.
Figure 4:
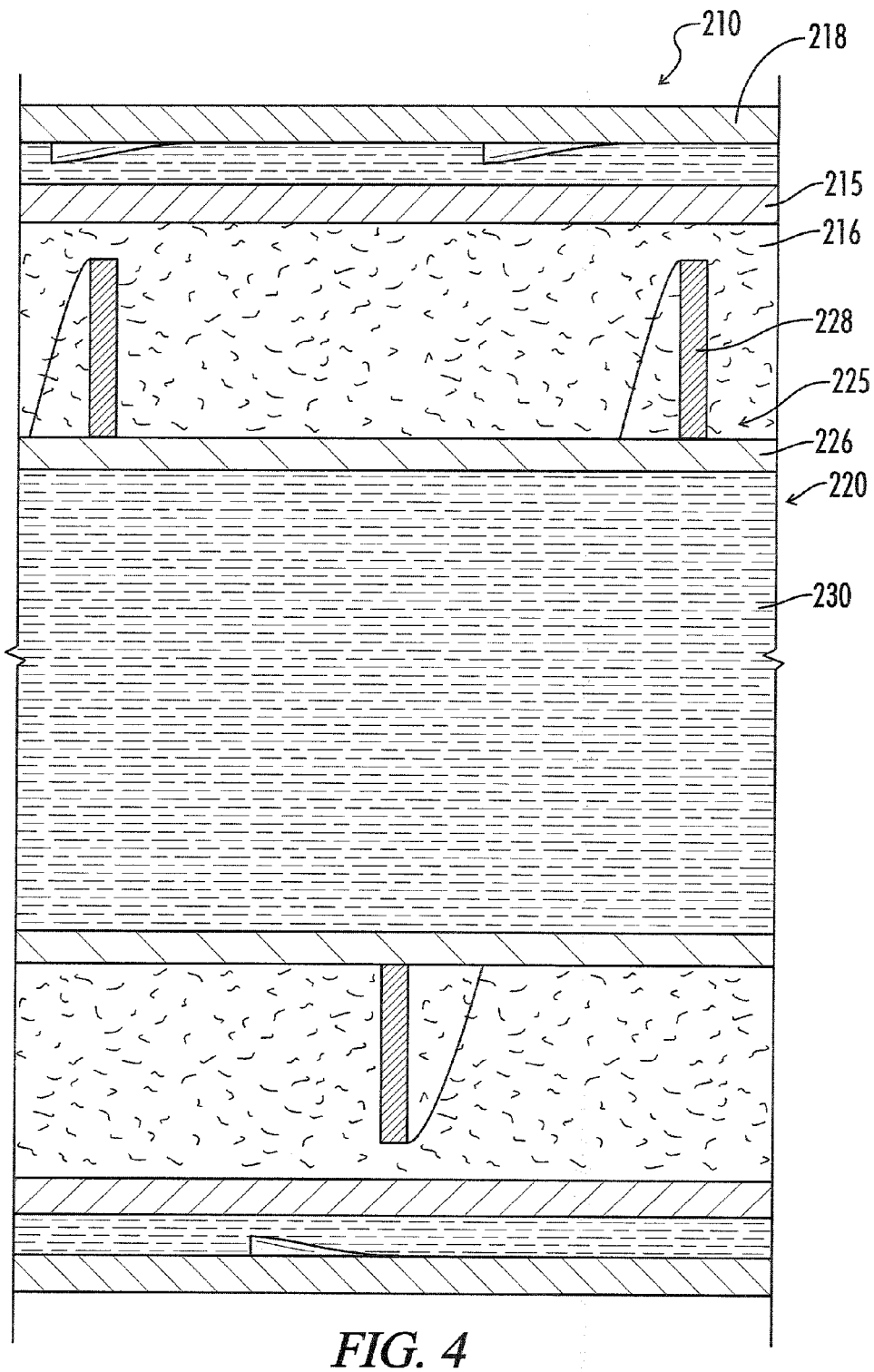
FIG. 4 is a cross-sectional view taken along line 4-4 in FIG. 3.

The entry tank with an internal agitator receives the feed stream or sludge 110 to begin processing (FIGS. 2-4). The feed stream may be preheated or heating may begin in the tank. The entry tank then passes the heated sludge into an accumulation tank 270 (which could alternatively be simply piping) adjacent a rotary meter 280 located proximate the bottom of the tank. The meter accumulates and passes a desirable quantity of preheated sludge into the primary heat exchanger 200 and may be used to control the volume throughput of the system.

The drying apparatus preferred in the present process includes a primary heat exchanger or dehydrator 200 which uses at least one and usually several jacketed screw augers 210. Each jacketed screw auger 210 has an internal auger or screw as well as a pathway 216 through the jacket 215 that receives the incoming sludge to remove the water therefrom by way of evaporation to produce a substantially dehydrated solid product. Several heat exchangers in series may be necessary to dehydrate the sludge desirably to produce a final product. Such multiple jacketed screw heat exchangers are of substantially the same construction and physical character Each screw heat exchanger 210 includes a rotary auger or screw 225 inside the heated jacket 215. The jacket use permits the passage of a heated medium such as heated liquid oil or water or steam or the like therein, which heats the walls of the jacket including the interior wall adjacent the flowpath of the sludge. The screw bore 226 is preferably hollow or otherwise includes internal piping permitting the passage of a heated medium such as heated liquid oil or water or steam or the like therein, which heats the entire evolving exterior wall of the screw adjacent the flowpath of the sludge. Thus, the sludge is heated on both sides as it flows between the interior wall of the jacket and the exterior wall of the screw. At least near the end of the screw a relatively thin film of sludge exists against the screw exterior to promote efficient vapor formation but most preferably the entire length of the screw has a thin film of sludge. The screws are inclined upwardly and the screws and jackets are in close proximity to each other with a relatively slender fluid flow pathway therebetween. As the fluid is driven by the rotation of the screw, the fluid and entrained solids are essentially squeezed between the screw and the inside of the jacket since the outer diameter of the screw is almost the same dimension as the inner diameter of the jacket and especially adjacent the auger flights 228. By way of example, a ten inch jacketed heat exchanger would have an outer diameter of ten inches, an internal jacket of approximately one and a half inches (providing the thermal fluid pathway) and an internal bore with a diameter of approximately six inches (e.g. 6.357"). The jacket internal bore houses the screw auger and the sludge pathway. The screw auger has a diameter of approximately 5⅞" with protruding flights, resulting in a sludge pathway of approximately less than one quarter of an inch.

The first and each subsequent screw heat exchanger receives the sludge as its input and outputs a more viscous sludge until substantially all water is removed from the sludge at the exit meter 285 from the last screw heat exchangers. The heat exchangers are ideally gravity fed at their entrances but inclined upwardly from horizontal distally and move the sludge via the rotary action of the screw flights from the entry to the exit while evaporating water therefrom. At the screw exit, the dehydrated product passes either to a subsequent screw dehydrator or exits through a final exit rotary meter 285. A driven and synchronized chain drive rotates the augers to move the sludge 110 along the system 100.

Figure 5:
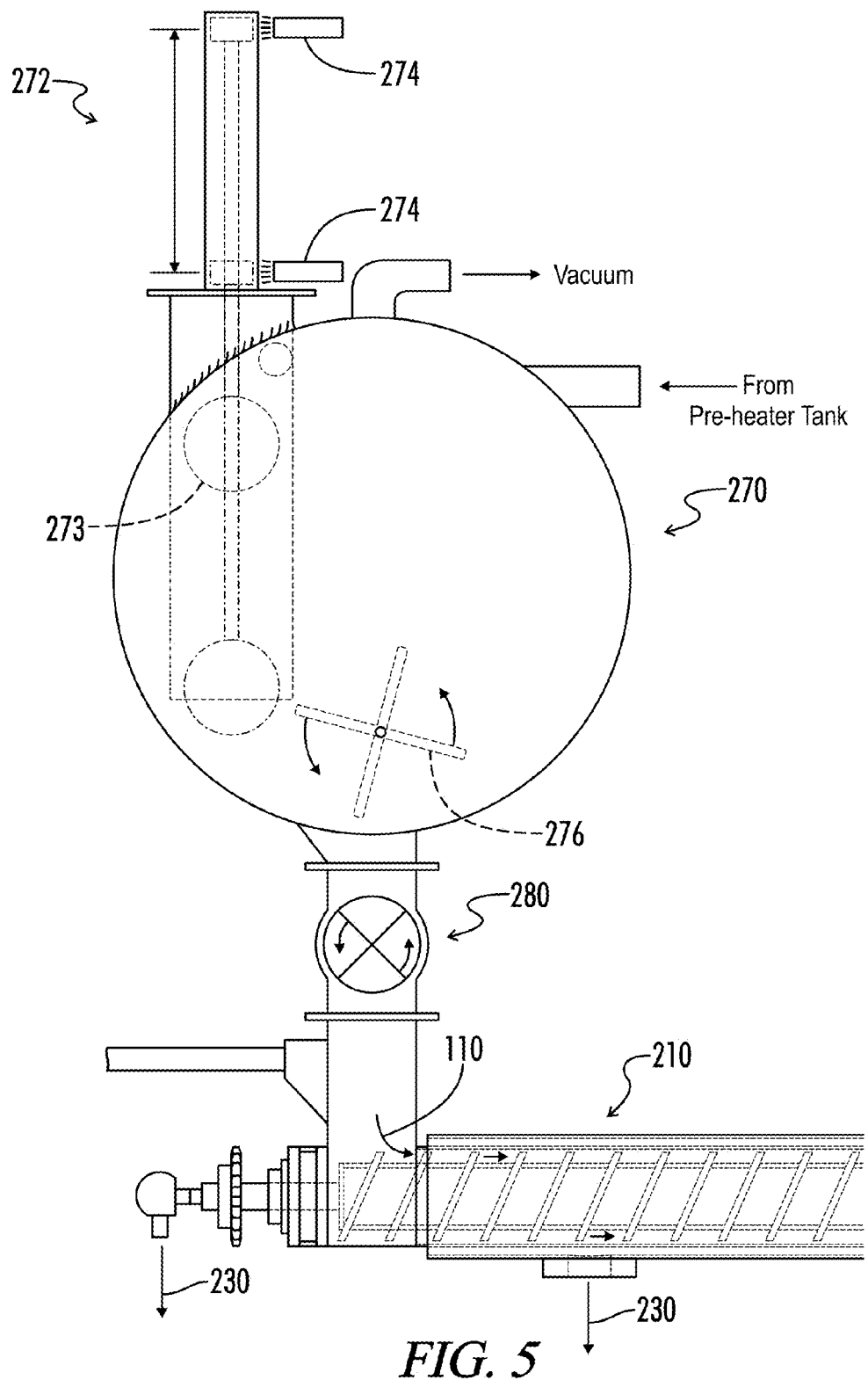
FIG. 5 is an enlarged schematic diagram of the feeder tank and upper portion of the dehydrator unit.
Figure 6:
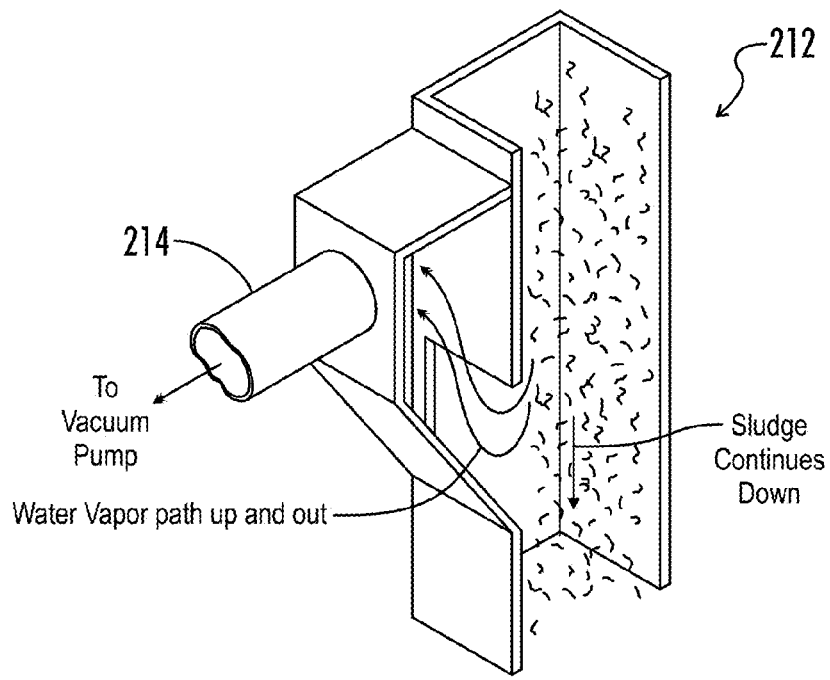
FIG. 6 is a perspective view of the vapor baffle outlet with an external wall portion removed to show the inner flow of material therethrough.
Figure 7:
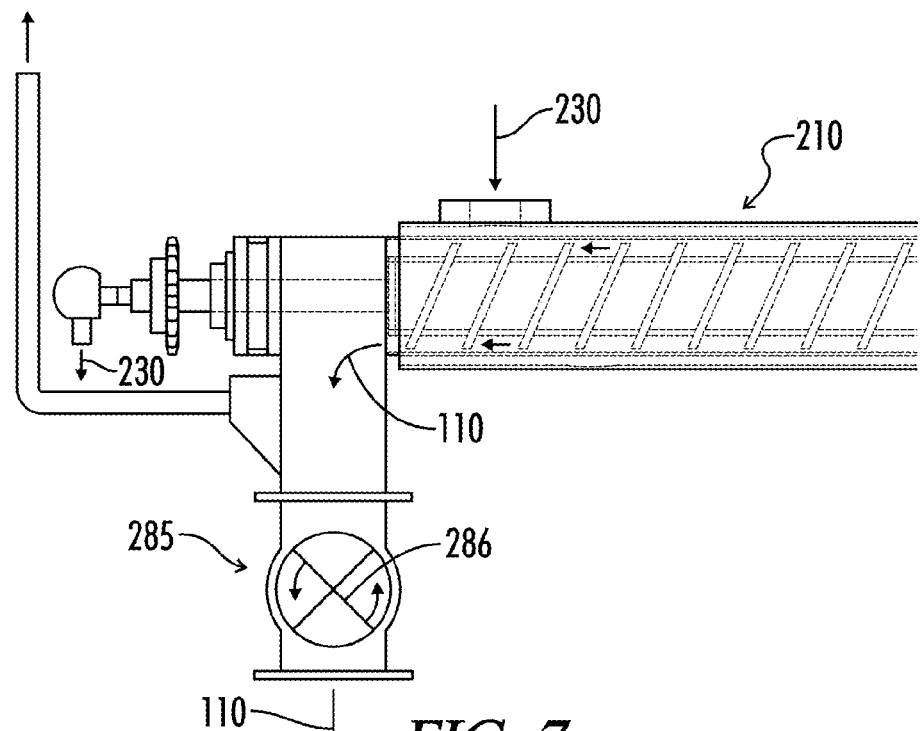
FIG. 7 is an enlarged schematic diagram of lower upper portion of the dehydrator unit and the exit port for dehydrated sludge.

The entry and exit rotary meters 280, 285 work like revolving doors and restrict any air entry into the system to small amounts of air that enter into the closed screws during operation (FIGS. 5-7). The exit rotary meter blades 286 are preferably Teflon coated to prevent the exiting sludge from accumulating thereon. The baffles 212 prevent the sludge from moving into the vapor stream exiting the dehydrators 210. As the vapor is created by the dehydrators 210, it moves along the dehydrators 210 until encountering a baffle 212 where it may exit via the vapor pipe 214 and move toward the preheater and condenser and the vacuum pump 250. Piping 214 includes pressure gauges and pressure relief valves.

A vacuum is preferably maintained by the constant removal of these small amounts of air from the system. While the vacuum does not have to be complete just lower than atmospheric pressure to prevent the escape of odorous gasses from the system, extensive testing has determined that a relatively substantial vacuum lowers the vapor pressure and boiling points of water desirably. Experiment has shown an average residency time for material throughput to be approximately 3 minutes in the system.

Figure 8:
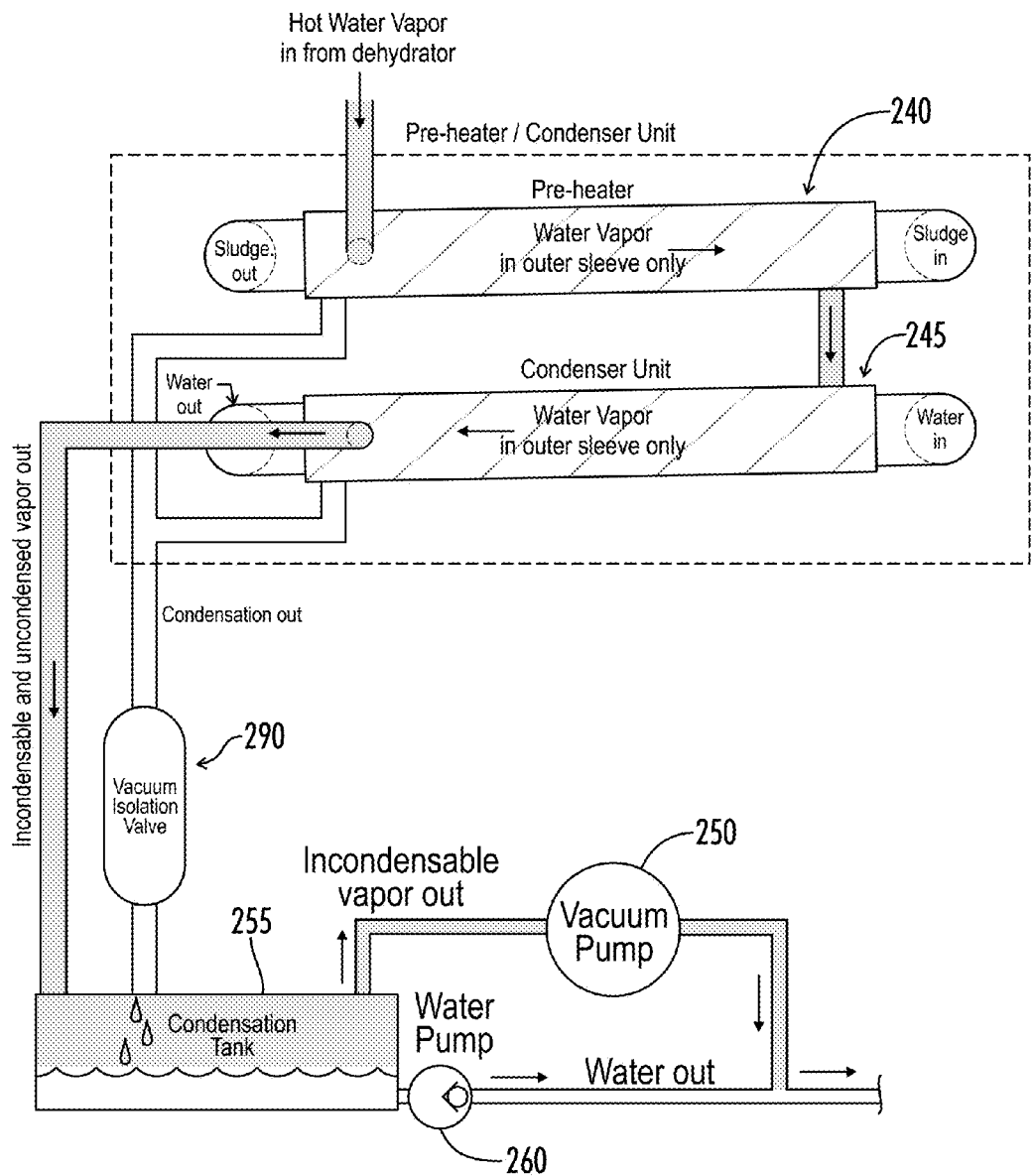
FIG. 8 is a schematic diagram of the preheater and condenser units and the condensation tank and vacuum isolation valve with fluid flow pathways designated.
Figure 9:
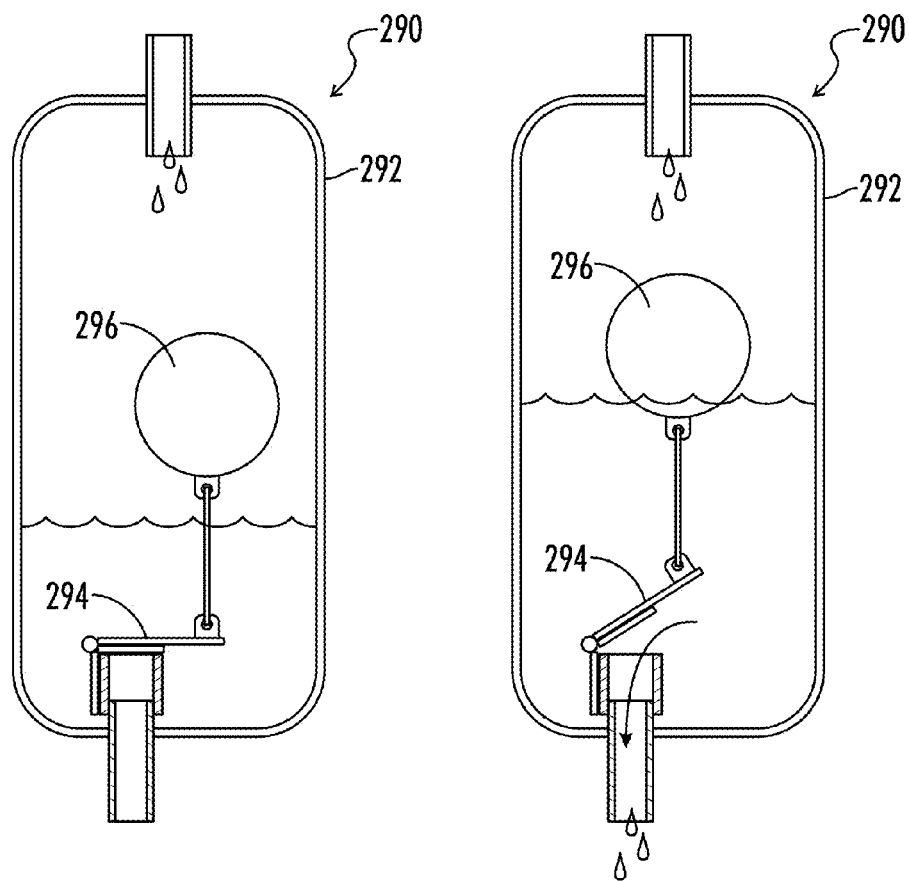
FIG. 9A is a perspective view of the vacuum isolation valve with an external wall portion removed to show the inner valve in a closed position with water contained therein.
FIG. 9B is a perspective view of the vacuum isolation valve with an external wall portion removed to show the inner valve in an open position and the flow of water therethrough; and, FIG. 10 is a schematic diagram of another exemplary embodiment of the wastewater treatment process and apparatus deployed on a trailer in a mobile implementation in accordance with the present invention.

The preheater 240 and subsequent condenser 245 are each jacketed pipes that receive the evaporated water from the dehydrators and capture the waste heat for warming the entering sludge while condensing the evaporated water and for condensing the evaporated water with fresh water from off site to substantially condense all of the evaporated water back into a liquid for discharge from the system and through which any remaining vacuum gasses may be bubbled for cleansing (FIG. 8).

A vacuum isolation valve 290 (FIGS. 9A and 9B) prevents vapors from directly exiting the preheater and entering the condensation tank and ensures that the vapors enter the condenser for condensation therein. The valve includes a holding tank 292 with entry and exit ports. The exit port may be covered by a flap 294 that is moved by a float 296. As the water level inside the tank 292 increases sufficiently, the float 296 rises correspondingly, which raises flap 294 from the exit port. As the water level inside the tank 292 decreases sufficiently, the float 296 rises correspondingly, which lowers flap 294 over the exit port.

The discharge of the water from the condenser or a collection tank 255 may require an additional pump 265 to overcome the static vacuum of the system to remove the water therefrom. Any exhaust gases from the vacuum pump may be piped from the pump to the water discharge piping and then back to the water treatment facility or otherwise discharged with the water.

Figure 10:
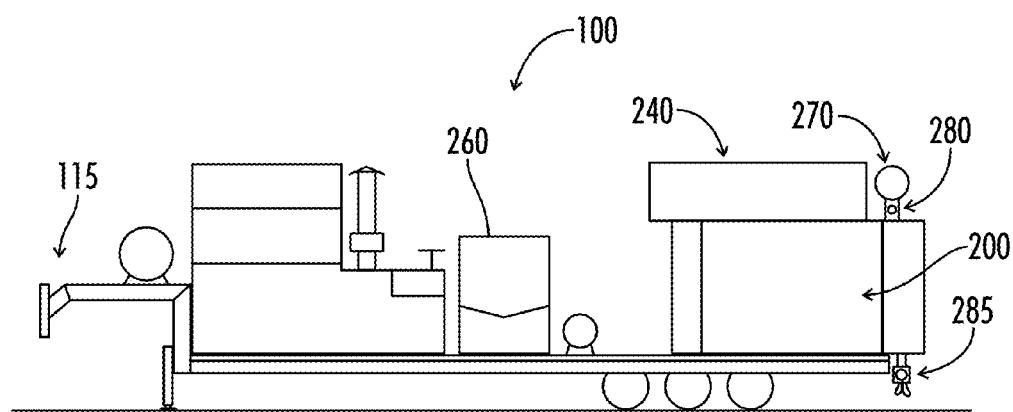

In another exemplary embodiment in accordance with the present invention the process 100 involves using a heated apparatus with an internal vacuum to remove entrained solids from wastewater in a mobile configuration mounted on a trailer 115 (FIG. 10). This process is a tail process that may be advantageously employed with a conventional upstream waste removal facility that separates most of the solids from the wastewater. Such a conventional treatment facility results in a wastewater substantially free from entrained solids and a thicker, more viscous wastewater, often referred to as sludge, which has a much higher concentration of solids to wastewater and generally oils and greases as well. The present invention is most particularly directed toward the treatment of such sludge to remove the entrained solids from the remaining wastewater and retrieve the oils and greases.

The process may use an entry tank 260 (which can be heated) with an agitator where oils and greases are decanted and removed from the tank as output streams. The entry tank dispenses decanted sludge from the bottom section and below the liquid level into an accumulation area 270 (feeding tank) and then into a rotary valve 280 that then dispenses the sludge into the primary heat exchanger 240. The primary heat exchanger evaporates the water under a vacuum to produce a dehydrated solid and vapors. This vacuum makes the process more energy efficient as the product being dehydrated does not have to be heated to as high a temperature and serves move the vapors out of the heat exchanger and into a subsequent condenser. Furthermore, by keeping vacuum in the system, odors are contained within it and do not freely escape since vapors are not released to atmosphere in this process. The vapors that are produced during the evaporation process are condensed before passing them to an off-site treatment facility for further processing such as the previously mentioned municipal treatment facility. The vapors produced from water in the process are thus condensed back to water in the process but without the removed solids.

When used with an animal processing facility producing solids containing fat and oil and grease entrained in the wastewater, the process takes substantially all of the oil and grease out of the sludge being dehydrated. This is important because dehydrated sludge can be used as a fuel source or be considered as a valuable byproduct as well as the oils and grease. The process may be particularly advantageously employed to dehydrate the sludge produced from facilities producing sludge high in oil and/or grease and/or animal fats or the like.

The entry tank with an internal agitator receives the feed stream or sludge to begin processing by first decanting the oils and greases from the sludge. The entry tank is preferably a jacketed vessel that can be heated and if heated, it may be heated by passing a heated medium such as the heated fluid (at around 400 degrees F.) used in the subsequent heat exchangers through an outer jacket to heat the sludge contained in the vessel (to approximately 187 degrees F.). The tank should be maintained at least under a slight vacuum (e.g. one inch of mercury) to prevent odor emanation therefrom. The entry tank then passes the decanted sludge into a feeder tank adjacent a rotary meter located adjacent the bottom of the feeder tank. The feeder tank is kept at the same pressure (i.e. substantial vacuum of approximately 20-25 inches mercury) as the rest of the system (i.e. heat exchangers and preheaters). The pressure differential between the entry tank and the feeder system is used to move sludge from the bottom of the entry tank to the feeder tank and the flow is controlled by a valve near the feeder tank. The feeder tank stores the heated and decanted sludge above the rotary meter to ensure a supply to the meter. The meter thus has an accumulated supply of sludge to pass to the primary heat exchanger when desired. The rotary meter passes the sludge to the heat exchanger upon rotation, like a revolving door. The speed of rotation of the meter may be controlled and thus controls the quantity of material entering the system or the material throughput. In one configuration, the rotary meter 280 includes four separate rotary meters that each feed the dehydrator 200, which includes four separate heat exchanger modules (i.e. one for each meter) and each module has four screw heat exchangers.

The drying apparatus preferred in the present process includes a primary heat exchanger or dehydrator which uses at least one and usually several jacketed screw augers. Each jacketed screw auger has an internal rotary auger or screw in an outer jacket that receives the incoming sludge to remove the water therefrom by way of evaporation to produce a substantially dehydrated solid product. Several heat exchangers in series may be necessary to dehydrate the sludge desirably to produce a final product. Such multiple jacketed screw heat exchangers are of substantially the same construction and physical character and have been discussed previously.

Each screw heat exchanger includes a rotary auger or screw inside a heated jacket. The jacket use permits the passage of a heated medium such as heated liquid oil (at temperatures as high as around 400 degrees F.) or water or steam or the like therein, which heats the jacket including the interior walls adjacent the flow path of the sludge. The screw is preferably hollow or otherwise includes internal piping permitting the passage of a heated medium such as heated liquid oil or water or steam or the like therein, which heats the screw including the exterior adjacent the flow path of the sludge. Thus, the sludge is heated between the jacket interior wall and the screw exterior. At least near the end of the screw a relatively thin film of sludge exists against the screw exterior to promote efficient vapor formation but most preferably the entire length of the screw exterior has a thin film of sludge. The screws are inclined upwardly and the screws and jackets are in close proximity to each other with a relatively slender fluid flow pathway therebetween. As the fluid is driven by the rotation of the screw, the fluid and entrained solids are essentially squeezed between the screw and the inside of the jacket by the auger flights since the outer diameter of the screw is almost the same dimension as the inner diameter of the jacket.

The first and each subsequent screw heat exchanger receives the sludge as its input and outputs a more viscous sludge until substantially all water is removed from the sludge at the exit from the last screw heat exchangers. The heat exchangers are ideally gravity fed at their entrances but inclined upwardly from horizontal distally and move the sludge via the rotary action of the screw flights from the entry to the exit while evaporating water therefrom. At the screw exit, the dehydrated product passes either to a subsequent screw dehydrator or exits through a final exit rotary meter. An electrically powered and synchronized chain drive rotates the augers to move the sludge along the system.

The entry and exit rotary meters work like revolving doors and may be controlled to increase or decrease sludge throughput in the process. The exit rotary meter blades are preferably Teflon coated to prevent the exiting sludge from accumulating thereon.

A vacuum is preferably maintained on the system. While the vacuum does not have to be complete just lower than atmospheric pressure to prevent the escape of odorous gasses from the system, extensive testing has determined that a relatively substantial vacuum lowers the vapor pressure and boiling points of water desirably.

The preheater 240 receives the gasses including all of the evaporated water from the dehydrators and capture the waste heat for warming the entering sludge while condensing the evaporated water into a liquid for discharge from the system and through which any remaining vacuum gasses may be bubbled for cleansing. The condensers are physically mounted in one configuration above the heat exchanger modules. Each condenser includes a sleeved pipe arrangement including two pipes. The vapors pass through one pipe surrounding the incoming unheated sludge passing through the other pipe. As the water vapor condenses, the resultant energy is absorbed by the incoming sludge heating it to approximately 130 degrees F. as it exits to the entry tank. The water vapors have condensed and the exiting water temperature is generally below 167 degrees F.

Other optional features, some of which are illustrated herein, may or may not be included with apparatus incorporating the basic aspects of present invention.

In describing a preferred embodiment of the invention illustrated in the drawings, specific terminology has been used for the sake of clarity. However, the invention is not intended to be limited to the specific terms selected, and it is to be understood that each specific term includes all technical equivalents which operate in a similar manner to accomplish a similar purpose.

What is claimed is:

1. A water treatment system for treating a high volume of viscous sludge containing entrained solids in water by evaporating the water from the viscous sludge to produce water and dehydrated solids, the system comprising:
   a tank with an internal agitator adapted to receive the high volume of viscous sludge and to mix the sludge;
   an entry rotary meter adapted to receive the mixed sludge from the tank and to dispense metered quantities of the sludge into a subsequent dehydrator;
   at least one dehydrator with a receiving port for the metered sludge and adapted to heat the metered sludge to evaporate the water therefrom to produce dehydrated solids and a gas containing evaporated water and wherein the dehydrator comprises at least one screw conveyor in a hollow jacket with an inner sleeve and an outer sleeve, the at least one screw conveyor adapted to receive the metered sludge and move the metered sludge from an entry to an exit inside the inner sleeve while a heated medium moves in the outer sleeve surrounding the screw conveyor and wherein the at least one jacketed screw conveyor includes a screw with a hollow central core adapted to receive a heated medium to heat the screw conveyor and wherein the screw conveyors incline upwardly from horizontal distally from the receiving port and with a baffle adjacent to the exit of the inner sleeve for the discharge of the gas containing evaporated water therefrom;
   an exit rotary meter adapted to receive the dehydrated solids from the dehydrator for discharge from the system;
   a condenser associated with the dehydrator to receive the gas from the dehydrator and to condense the evaporated water from the gas into a liquid that is discharged from the system and provide dehydrated gas to a subsequent vacuum pump; and,
   a vacuum pump adapted to maintain a relatively static pressure below atmospheric in the tank and dehydrator and condenser.

2. The system as recited in claim 1 wherein the at least one jacketed screw conveyor comprises a plurality of substantially identical jacketed screw conveyors arranged in series.

3. The system as recited in claim 2 further comprising a synchronized drive chain for turning the screw conveyors simultaneously.

4. The system as recited in claim 3 further comprising a control system to periodically actuate the drive chain in response to evaporative conditions inside the screw conveyors.

5. A water treatment system for treating a high volume of viscous sludge containing entrained solids in water by evaporating the water from the viscous sludge to produce water and dehydrated solids, the system comprising:
   a tank with an internal agitator adapted to receive the viscous sludge and to mix the sludge;
   an entry rotary meter adapted to receive the mixed sludge from the tank and to dispense metered quantities of the sludge into a subsequent dehydrator;
   at least one dehydrator with a port receiving the metered sludge and adapted to heat the metered sludge to evaporate the water therefrom to produce dehydrated solids and a gas containing evaporated water, the dehydrator comprising at least one screw conveyor in a hollow jacket with an inner sleeve and an outer sleeve, the at least one screw conveyor adapted to receive the metered sludge and move the metered sludge from an entry to an exit inside the inner sleeve while a heated medium moves in the outer sleeve surrounding the at least one screw conveyor and counter to the flow of the metered sludge along the at least one screw conveyor and wherein the at least one screw conveyor includes a screw with a hollow central core adapted to receive a heated medium to heat the at least one screw conveyor and with a baffle adjacent to the exit of the inner sleeve for the removal of vapors therefrom;
   an exit rotary meter adapted to receive the dehydrated solids from the dehydrator for discharge from the system;
   a condenser associated with the dehydrator to receive the gas from the dehydrator and to condense the evaporated water from the gas into a liquid that is discharged from the system; and,
   a vacuum pump adapted to maintain a relatively static pressure below atmospheric in the tank and dehydrator and condenser.

6. The system as recited in claim 5 wherein the at least one jacketed screw conveyor comprises a plurality of substantially identical conveyors arranged in series.

7. The system as recited in claim 6 further comprising a synchronized drive chain for turning the screw conveyors simultaneously.

8. The system as recited in claim 7 further comprising a control system to periodically actuate the drive chain in response to evaporative conditions inside the screw conveyors.

* * * * *